(12) United States Patent
Kini et al.

(10) Patent No.: US 11,171,866 B2
(45) Date of Patent: Nov. 9, 2021

(54) MEASURING PACKET RESIDENCY AND TRAVEL TIME

(71) Applicant: Juniper Networks, Inc., Sunnyvale, CA (US)

(72) Inventors: Vasanthi N Kini, Bangalore (IN); Manikandan Musuvathi Poornachary, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 19 days.

(21) Appl. No.: 16/730,835

(22) Filed: Dec. 30, 2019

(65) Prior Publication Data

US 2021/0203596 A1 Jul. 1, 2021

(51) Int. Cl.
*H04L 12/717* (2013.01)
*H04L 12/26* (2006.01)
*H04L 12/721* (2013.01)
*H04L 12/741* (2013.01)

(52) U.S. Cl.
CPC .......... *H04L 45/42* (2013.01); *H04L 43/062* (2013.01); *H04L 43/0876* (2013.01); *H04L 45/38* (2013.01); *H04L 45/74* (2013.01)

(58) Field of Classification Search
CPC combination set(s) only.
See application file for complete search history.

(56) References Cited

U.S. PATENT DOCUMENTS

| 7,664,125 | B1* | 2/2010 | Bauer | H04L 41/0233 370/408 |
|---|---|---|---|---|
| 2011/0051754 | A1* | 3/2011 | Lansdowne | H04J 3/0697 370/503 |
| 2015/0333992 | A1 | 11/2015 | Vasseur et al. | |
| 2016/0277272 | A1* | 9/2016 | Peach | H04L 43/0858 |
| 2017/0295231 | A1* | 10/2017 | Clemm | H04L 67/06 |
| 2019/0068470 | A1 | 2/2019 | Mirsky | |
| 2019/0104151 | A1* | 4/2019 | Cheng | H04L 9/3213 |
| 2020/0053678 | A1* | 2/2020 | Moon | H04W 88/023 |

OTHER PUBLICATIONS

Extended Search Report from counterpart European Application No. 20164695.7, dated Aug. 14, 2020, 10 pp.

(Continued)

*Primary Examiner* — Xavier S Wong
(74) *Attorney, Agent, or Firm* — Shumaker & Sieffert, P.A.

(57) ABSTRACT

The disclosure sets forth techniques, devices, systems, and methods for measuring a packet residency time in a network device. In some aspects, a network flow measurement protocol includes data fields in flow data records exported to a traffic collector, including a packet ingress time and a packet egress time. The data fields allow the calculation of the packet residency time within a network device, as well as the time required for the packet to traverse between two network devices in the network. A filter can be installed on one or more network devices in a network. For packets that match the filter criteria, the network device records the times of packet arrival and packet departure, and, in some aspects, a packet residency time of the packet with the network device. The network device exports the flow data record pertaining to this packet to a traffic flow data collector.

18 Claims, 5 Drawing Sheets

(56) References Cited

OTHER PUBLICATIONS

Mirsky et al., "Residence Time Measurement in MPLS Networks," Internet Engineering Task Force (IETF): RFC 8169, May 2017, 30 pp.
Vink, "IPFIX Use Cases in Network Monitoring and Analysis," Niagara Networks Retrieved Aug. 3, 2020 from: https://blog.niagaranetworks.com/blog/ipfix-use-cases-in-network-monitoring-and-analysis, May 21, 2019, 10 pp.
Claise et al., "Specification of the IP Flow Information Export (IPFIX) Protocol for the Exchange of IP Traffic Flow Information," Network Working Group, RFC 5101, Jan. 2008, 64 pp.
Claise et al., "Specification of the IP Flow Information Export (IPFIX) Protocol for the Exchange of Flow Information," IETF RFC 7011, Sep. 2013, 77 pp.
Hedayat et al., "A Two-Way Active Measurement Protocol (TWAMP)," Network Working Group, RFC 5357, Oct. 2008, 27 pp.

\* cited by examiner

MEASURING PACKET RESIDENCY AND TRAVEL TIME

TECHNICAL FIELD

The disclosure relates to computer networks and, more specifically, to measuring packet residency and travel time in computer networks.

BACKGROUND

A computer network is composed of a set of nodes and a set of links that connect one node to another. For instance, a computer network may be composed of a set of routers while the set of links may be cables between the routers. When a first node in the network sends a message to a second node in the network, the message may pass through many links and many nodes. The set of links and nodes that the message passes through while traveling from the first node to the second node is referred to as a path through the network. There may be more than one path between the first node and the second node.

Network traffic may travel along the paths, passing through the routers, which may perform one or more operations in addition to routing the network traffic along the path. One such operation may include general flow-specific information gathering. That is, a router may collect information concerning flows of network traffic. A flow may be identified by a so-called five-tuple that includes a source address, a source port, a destination address, a destination port, and a protocol. The flow information may include statistics regarding traffic loads, such as a number of packets per flow per minute or an amount of data per flow per minute. As one example, the router may collect the flow information to provide local insight into network traffic loads.

Using an export protocol, the router may export the flow information. An example of an export protocol includes the Internet protocol flow information export UPFIX) protocol. Information regarding IPFIX is set forth in B. Claise, "Specification of the IP Flow Information Export (IPFIX) Protocol for the Exchange of IP Traffic Flow Information," IETF RFC 5101 (January 2008), B. Claise, "Specification of the IP Flow Information Export (IPFIX) Protocol for the Exchange of Flow Information," IETF RFC 7011-7015 (September 2013), the entire content of each of which is incorporated herein by reference. The router may export the flow information to allow for a number of different operations. For example, the router may export the flow information to a central managing device (such as a software defined network controller). The central managing device may then take various actions based, at least in part, on the exported flow information.

SUMMARY

In general, techniques for using packet flow monitoring to measure residency time for a packet are described. As described herein, the packet residency time of a packet refers to the time elapsed from when the packet ingresses to a network device, the network device applies one or more network services to the packet, and the packet egresses from the network device.

The disclosure sets forth techniques, devices, systems, and methods for measuring a packet residency time using existing protocols without requiring the implementation of a new protocol. In some aspects, a network flow measurement protocol such as the IPFIX protocol can be extended to include additional data fields in flow data records exported to a traffic collector, including a packet ingress time and a packet egress time. The additional data fields allow the calculation of the packet residency time within each network device, as well as the time required for the packet to traverse between two network devices in the network. In accordance with the techniques of the disclosure, a network flow measurement protocol such as the IPFIX protocol can be extended to include at least a packet ingress time and a packet egress time.

Based on the traffic to be monitored, a filter can be installed on one or more network devices in the network. The filter has monitoring properties defined in a "monitoring instance." When a network device receives a packet that matches the filter criteria, the network device records the time at which the packet enters the network device, the time at which the packet departs the network device, and, in some aspects, a packet residency time of the packet with the network device. The network device exports the flow data record pertaining to this packet to a traffic flow data collector. Exported flow data records can include values for a packet arrival time, packet departure time, packet residency time, and monitoring instance name, along with other attributes identifying the source and destination of the packet.

Using the techniques set forth herein, a traffic collector may derive information about how much time a packet resided in each network device along a path. Furthermore; by comparing the packet arrival time and packet departure time of different network devices, the traffic collector can derive the time taken by the packet to traverse between two network devices. Therefore, a traffic collector operating in accordance with the techniques of the disclosure may help to identify which network device or path between network devices is causing the most delay. With packet residency time reported in the flow data records, a traffic collector as described herein may derive information on which network device is causing delay or congestion, thereby helping to identify delay caused by particular services applied on the network device.

The techniques of the disclosure may provide one or more advantages. For example, the techniques of the disclosure obviate the need for network devices to support an additional protocol to monitor packet delay or packet residency time. Furthermore, the techniques of the disclosure enable a network device to measure end-to-end delay for transiting network traffic. The techniques of the disclosure may also enable a network device to measure packet residency time or delay within a network device where the network device applies one or more services to the packet. Furthermore, the techniques of the disclosure may be easily adopted due to the widespread support of network flow measurement protocols such as IPFIX by various customers and network devices. Therefore, the techniques of the disclosure may allow for enhanced packet delay monitoring without substantially impacting performance via the extension of existing network flow measurement protocols to include the data fields described above. Furthermore, in situations where network traffic is load-balanced across multiple paths, the techniques of the disclosure may allow for the identification of a fastest path through the network, thereby improving traffic engineering and path selection for network traffic within a network.

In some aspects, a network device includes: a first network interface; a second network interface; a forwarding unit configured to, receive, via the first network interface; a network packet of a packet flow, determine a packet arrival time of the network packet at the first network interface, provide the network packet to the second network interface for transmission toward a destination, determine a packet departure time for the network packet from the second network interface; and a flow data exporter configured to, create a flow data record specifying the packet arrival time and the packet departure time, and provide the flow data record to a traffic flow data collector device physically separate from the network device.

In some aspects, a traffic flow data collector includes: one or more processors; and a computer-readable medium comprising instructions for causing the one or more processors to: receive one or more flow data records from a plurality of network devices, each of the flow data records including a packet arrival time and a packet departure time, determine, from the one or more flow data records, one or more network paths from a source device to a destination device, the one or more network paths including two or more of the plurality of network devices, identify a first network device along the one or more network paths having a highest packet residency time, the packet residency time based on the packet arrival time and the packet departure time, and determine a delay reduction action for the first network device.

In some aspects, a method includes: obtaining, by at least one computing device, a packet arrival time indicating a time that a network packet arrives at a network device; obtaining, by the at least one computing device, a packet departure time indicating a time the network packet departed the network device; determining, by the at least one computing device, a packet residency time for the network device based on the packet arrival time and the packet departure time; and determining, by the at least one computing device and based on the packet residency time for the network device and packet residency times for a plurality of other network devices, a delay reduction action for one or more of the network devices and the plurality of other network devices.

BRIEF DESCRIPTION OF DRAWINGS

Like reference characters denote like elements throughout the figures and text.

DETAILED DESCRIPTION

In general, the disclosure describes techniques for measuring a packet residency time of a packet in the network node as well as a travel time of the packet between network devices in a path through the network for a packet. Some network measurement protocols may measure only a round-trip delay between two network devices. An example of such a network measurement protocol is Two-Way Active Measurement Protocol (TWAMP). Additional information with respect to TWAMP is set forth in K. Hedayat, "A Two-Way Active Measurement Protocol (TWAMP)", Internet Engineering Task Force (IETF) RFC 5357 (October 2008), the entire content of which is incorporated herein by reference. While protocols such as TWAMP can measure an end-to-end packet travel time along a network path between a source and destination node, such protocols are unable to measure travel time between network devices along the network path. Furthermore, protocols such as TWAMP are unable to measure the packet residency time of a packet within each network device along the network path and are thus unable to determine the impact of network services applied to packets on the network devices along the path between the source and destination. Additionally, TWAMP, and other types of real-time performance monitoring (RPM) require that both the source and destination devices support the protocol and may be limited by a number of probes that can be used to obtain performance metrics.

Figure 1:
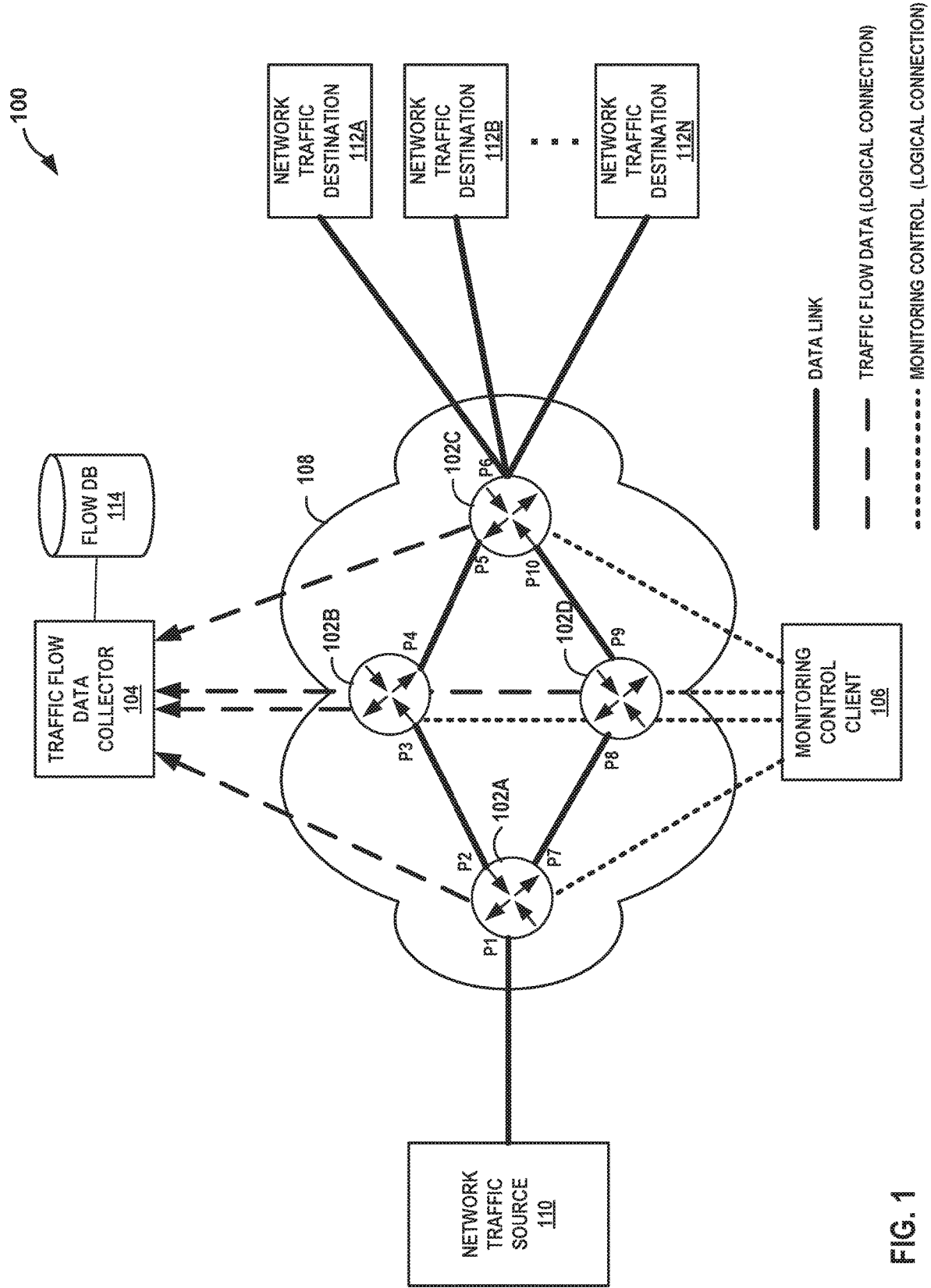
FIG. 1 is a block diagram illustrating an example network system in accordance with techniques described herein.

FIG. 1 is a block diagram illustrating an example network system 100 in accordance with techniques described herein. In some aspects, network system 100 can include a network traffic source 110 that communicates with one or more network traffic destinations 112A-112N (generically referred to as a network traffic destination 112) via a network 108, a traffic flow data collector 104, and a monitoring control client 106.

Network traffic source 110 can be any network device that acts as a source of network traffic. Examples of network traffic sources 110 include servers, Internet-of-Things (IoT) devices and any other device that generates and transmits network packets over network 108. As an example, network traffic source 110 can be a streaming video server that transmits packets comprising video data to video clients executing on network traffic destinations 112A-112N via network 108. Video monitoring services may measure parameters such as delay factors, jitter, loss rate. Packets generated by protocols such as Route Table Manager (RTM) or TWAMP do not go through services such as video monitoring, because the video monitoring service cannot recognize the TWAMP-type packets. For this reason, it may be difficult for RTM and TWAMP to measure the time it takes for service nodes to apply real-time services to video traffic.

Network 108 can include one or more network devices 102A-102D (generically referred to as a network device 102). A network device 102 can be any type of device that can receive a network packet from a network traffic source 110 or another network device 102 and forward the network packet to another network device 102 or network traffic destination 112. For example, network device 102 can be a router such as a provider edge or customer edge router, a core router, a gateway, a bridge, a hub, or other network device such as a switch.

During operation, a network device 102 may collect packet flow measurements with respect to some or all of the network packets that are received and forwarded by the network device 102. In the example illustrated in FIG. 1, packet flow measurements can be obtained at observation points labeled P1-P10 in FIG. 1. Each of the observation points can measure aspects of network packet flow through a network device 102. In the example illustrated in FIG. 1, observation points P1, P2 and P7 can measure aspects of packet flow through network device 102A. Similarly, observation points P3 and P4 can measure aspects of packet flow through network device 102B, observation points P5, P6 and P10 can measure aspects of packet flow through network device 102C, and observation points P8 and P9 can measure aspects of packet flow through network device 102D. In some aspects, the observation points P1-P10 can measure a packet arrival time of a network packet at a network interface of a corresponding network device 102A-102D and can measure a packet departure time of the network packet after processing by the corresponding network device 102A-102I).

A network packet may take one of multiple paths through network 108, depending on the network devices 102A-102D that receive the packets. In the example illustrated in FIG. 1, two network paths exist for traffic between network traffic source 110 and a network traffic destination 112A-112N. A first path includes network device 102A, 102B and 102C. A second path includes network device 102A, 102D and 102C, A network interface receiving a network packet may be referred to as an ingress network interface with respect to the network packet. A network interface forwarding the network packet on to a next hop towards a network traffic destination 112A-112N may be referred to as an egress network interface with respect to the network packet. A network interface may be an ingress network interface with respect to network packets passing through the network device in one direction, and an egress network interface with respect to other network packets passing through the device in another direction. Thus, for network packets originating at network traffic source 110 that are transmitted to one or more of network traffic destinations 112A-112N and traverse network 108 via the first path, observation points P1, and P8 may be associated with ingress network interfaces of network devices 102A, 102B and 102C respectively, and observation points P2, P4 and P6 may be associated with egress network interfaces of network devices 102A, 102B and 102C respectively. For packets originating at network traffic source 110 that are transmitted to one or more of network traffic destinations 112A-112N and traverse network 108 via the second path, observation points P1, P8, and P10 may be associated with ingress network interfaces of network devices 102A, 102D and 102C respectively, and observation points P7, P9 and P6 may be associated with egress network interfaces of network devices 102A, 102D and 102C respectively.

As noted above, a network device 102 can measure a packet arrival time and packet departure time of a network packet passing through the network device 102. The network device 102 can store the packet arrival times and packet departure times of network packets in data flow records and transmit the data flow records to traffic flow data collector 104. In some aspects, the network device 102 can determine the packet residency time and include the packet residency time in the data flow record.

Traffic flow data collector 104 can receive the data flow records from the network devices 102A-102D and store the data flow records in flow database 114 for analysis. In some aspects, traffic flow data collector 104 can use the packet arrival times and packet departure times to determine packet residency times for a network packet if the network device 102 does not determine a packet residency time, A packet residency time can represent the amount of time a network device 102 takes to process the network packet before forwarding the network packet to the next hop. The packet residency time can thus include the packet processing time to determine the next hop for the network packet along with the processing time associated with services executed on the network device 102 such as firewall services, filtering services, routing services, or other services provided on the network device 102.

Traffic flow data collector 104 or an analysis application (not shown) can use the packet arrival times, packet departure times, and packet residency times to determine various aspects of network traffic flow through network 108, For example, with respect to the first path of network packets originating from network traffic source 110 to network traffic destinations 112A-112N (e.g., the path including network devices 102A, 102B and 102C), a network path travel time can be determined using packet arrival times determined at observation points P1, P3 and P5 and packet departure times at observation points P2, P4 and P6 Additionally, packet residency times for each of the network devices 102A, 102B and 102C can be determined. Similarly, with respect to the second path of network packets originating from network traffic source 110 to network traffic destinations 112A-112N (e.g., the path including network devices 102A, 102D and 102C), a network path travel time using packet arrival times determined at observation points P1, P8 and P10 and packet departure times at observation points P7, P9 and P6 can be determined. Additionally, packet residency times for each of the network devices 102A, 102D and 102C can be determined. Traffic flow data collector 104 or an analysis application can use the network path travel times and packet residency times to determine the fastest paths through network 108. Further, the packet residency times for the network devices can be used to determine network devices 102 service nodes) that may be causing the most delay in packet throughput. Upon determining that a network device 102 is causing delay, the traffic flow data collector 104 or other network management application can make updated routing decisions to steer network traffic away from the network device or node causing the most delay. Further, a network administrator can determine whether services provided by a network device causing delay should be removed, modified or load balanced in order to improve network throughput.

Monitoring control client 106 can be used to control which packets are measured at observation points. For example, monitoring control client 106 can provide a user interface for use by a network administrator to determine which packets are selected for measurement. In some aspects, monitoring control client 106 can be used to select source addresses, destination addresses, protocols and sampling rates for filters applied by the network devices 102 that select network packets for measurement at observation points.

In the example illustrated in FIG. 1, a single network traffic source 110 is shown. A network system 100 will typically have more than one network traffic source, and in fact, may have many network traffic sources 110. Additionally, a network traffic source 110 may act as a network traffic destination 112 with respect to other network traffic sources 110. Similarly, a network traffic destination 112 may act as a network traffic source 110 with respect to other network traffic destinations. Further, four network devices 102A-102D are shown in the example illustrated in FIG. 1. A network system 100 may have fewer or more than four network devices 102.

Further details regarding aspects of the configuration and operation of a network device 102, traffic flow data collector 104 and monitoring control client 106 will be provided with respect to FIGS. 2-5.

Figure 2:
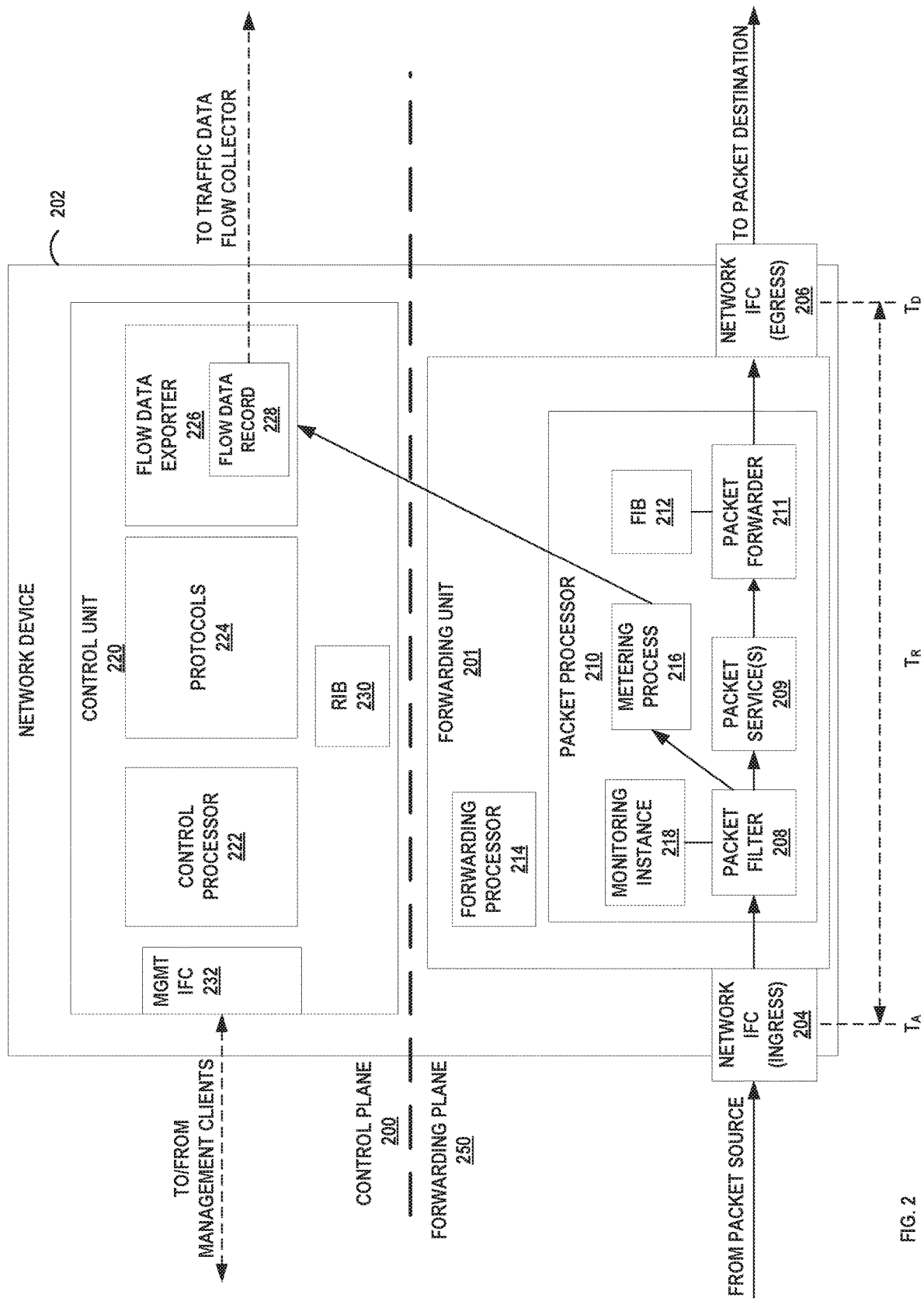
FIG. 2 is block diagram illustrating, in further detail, an example network device configured in accordance with various aspects of the techniques described in this disclosure.

FIG. 2 is block diagram illustrating, in further detail, an example network device 202 configured in accordance with various aspects of the techniques described in this disclosure. Network device 202 can be any of the network devices 102A-102D illustrated in FIG. 1. The network device 202 may be logically partitioned into a control plane 200 and a forwarding plane 250 (sometimes referred to as a data plane). As shown in FIG. 1, control plane 200 of network device 202 includes a control unit 220 and forwarding plane 250 includes a forwarding unit 201 and at least two network interfaces (e.g., network interface 204 and network interface 206). Network interfaces 204 and 206 may be network interfaces provided by a single unit such as a line card with multiple network interfaces, or may be provided as separate units (e.g., separate line cards).

Control unit 220 may provide capabilities related to determining a network topology and maintaining routing information for the network topology. In some aspects, control unit 220 includes a control processor 222, protocols 224, a flow data exporter 226 and a management interface 232. Control processor 222 may include processing circuitry that executes software instructions, such as those used to define a software or computer program that executes as a process on the control processor to perform techniques described herein. For example, control processor 222 may execute instructions that implement protocols 224 and/or flow data exporter 226. Alternatively, or in addition, control processor 222 may include dedicated hardware, such as one or more integrated circuits, one or more Application Specific integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. The software and data may be stored in a computer-readable storage medium (not shown in FIG. 2), such as non-transitory computer-readable mediums including a storage device (e.g., a disk drive, or an optical drive) and/or a memory such as RAM (including various forms of DRAM, e.g., DDR2 SDRAM, or SRAM), Flash memory, another form of fixed or removable storage medium that can be used to carry or store desired program code and program data.

Control unit 220 may implement various routing protocols 224. Examples of such protocols include Open Shortest Path First (OSPF), Intermediate System to Intermediate System (IS-IS), Routing Information Protocol (RIP), RIPv2, IGRP, Border Gateway Protocol (BGP), Path Vector Routing Protocol, Exterior Gateway Protocol (EGP), IGRP, and Enhanced Interior Gateway Routing Protocol (EIGRP). In some aspects, control unit 220 can receive one or more control messages via management interface 232 that include routing information in a format specified by one or more of protocols 224. Control unit 220 can interpret the data in the message according to the protocol and update a routing information base (RIB) 230 with new routing information as specified by the message. Additionally, control processor 222 can update forwarding information base (FIB) 212 as appropriate based on information in the RIB 230.

Forwarding unit 201 may provide capabilities related to processing network packets received at network interfaces of the network device 202. In some aspects, forwarding unit 201 includes a forwarding processor 214 and a packet processor 210. Forwarding unit 201 may receive an incoming packet (e.g., a packet at an ingress network interface 204), process the packet, and select an egress network interface (e.g., network interface 206) to send the packet to the next hop (e.g., the next network device in a path through a network from the source address of the packet to the destination address of the packet). The next hop may be determined according to FIB 212.

Forwarding processor 214 comprises circuitry that executes software instructions, such as those used to define a software or computer program stored in a computer-readable storage medium (not shown in FIG. 2), such as non-transitory computer-readable mediums including a storage device (e.g., a disk drive, or an optical drive) and/or a memory such as RAM (including various forms of DRAM, e.g., DDR2 SDRAM, or SRAM), Flash memory, another form of fixed or removable storage medium that can be used to carry or store desired program code and program data. Alternatively, or in addition, forwarding processor 214 may include dedicated hardware, such as one or more integrated circuits, one or more ASICs, one or more ASSPs, one or more FPGAs, or any combination of one or more of the foregoing examples of dedicated hardware, for performing the techniques described herein.

Packet processor 210 processes packets by performing a series of operations on each packet over respective internal packet forwarding paths as the packets traverse the internal architecture of network device 202. Packet processor 210 may include one or more configurable hardware chips (e.g., a chipset) that, when configured by applications executing on control unit 220, define the operations to be performed on packets received by packet processor 210. Each chipset may in some examples represent a "packet forwarding engine" (PEE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic.

Packet processor 210 may process packets to identify packet properties and perform actions based on the properties. Packet processor 210 may include forwarding path elements that, when executed, cause the packet processor 210 to examine the contents of each packet (or another packet property, e.g., incoming interface) and on that basis make forwarding decisions, apply filters, and/or perform accounting, management, traffic analysis, and load balancing, for example. The result of packet processing determines how a packet received on a network interface (e.g., ingress network interface 204) is forwarded to another network interface (e.g., egress network interface 206) or otherwise processed by packet processor 210 of forwarding unit 201.

Packet filter 208 can obtain packet data and select packets for further processing according to match criterial. Packet filter 208, when present, may select packets according to rules and/or data defined in monitoring instance 218. As an example, monitoring instance 218 may include data ("monitoring instance data") specifying a 5-tuple comprising a source address, a destination address, a source port, a destination port, and a protocol. If an incoming packet's 5-tuple matches the 5-tuple specified in monitoring instance 218, the packet may be further processed as specified in monitoring instance 218. In addition, a monitoring instance may define a sampling rate. For instance, a sampling rate of 1024 would indicate that every $1024^{th}$ incoming packet is selected and examined to determine if the selected packet matches the properties specified in monitoring instance 218 (e.g., the 5-tuple). A sampling rate of one (1) would indicate that every packet is selected to be examined to determine if further processing is to be performed as specified in monitoring instance 218. A monitoring instance may be identified by a monitoring instance name. More than one monitoring instance 218 may be active on a network device 202 at any given time. Further, placing the same monitoring instance on multiple network devices in a network can provide the capability to receive flow data that can be used to identify paths that a packet takes through the network.

The incoming packet may be processed by one or more packet services 209. Examples of such services include access control services, statistical sampling services, traffic policing services, rate limiting services, firewall services and accounting services.

The monitoring instances 218 and services 209 that may be used to process an incoming packet may be specified by a monitoring control client 106 (FIG. 1). For example, a monitoring control client can communicate one or more messages to a network device 202 via management interface 232 to specify one or more monitoring instances and/or one or more services that are to be configured on network device 202. Control processor 222 can communicate with forwarding unit 201 to configure the monitoring instances and services 209 according to the information specified in the one or more messages. In some aspects, a Dynamic Tasking Control Protocol (DTCP) can be used for communications between a monitoring control client 106 and a network device 202 via management interface 232.

The incoming packet can be processed by packet forwarder 211. Packet forwarder 211. Packet forwarder 211 examines the header of the incoming packet to determine a destination address for the packet. Packet forwarder 211 can consult FIB 212 to determine the next hop towards the destination device for the packet. Base on forwarding information obtained from FIB 212, packet forwarder 211 can select an egress network interface 206 to transmit the packet to the next hop.

As discussed above, a network device such as network device 202 may determine a packet arrival time $T_A$ indicating a time that a packet arrives at a network interface of the network device (e.g., ingress network interface 204) and a packet departure time $T_D$ indicating a time that a packet is forwarded via a network interface of the network device (e.g., egress network interface 206). A packet filter 208 may select the packets for which a packet arrival time and packet departure time are determined and recorded. In some aspects, a monitoring instance 218 may specify that incoming packets that have header data that matches properties specified in monitoring instance 218 and that are selected according to the sampling rate are to be provided to metering process 216 by packet filter 208.

Metering process 216 can record the packet arrival time $T_A$ of the selected packet and the packet departure time $T_D$ of the packet. Metering process 216 can provide the packet arrival time $T_A$ and packet departure time $T_D$ to a flow data exporter 226. Flow data exporter 226 can store the packet arrival time $T_A$ and the packet departure time $T_D$ in a flow data record 228. In some implementations, flow data exporter 226 may calculate a packet residency time $T_R$ that represents the time that a packet was resident in a network device. For example, the packet residency time can be the elapsed time used by the packet filter 208, packet service(s) 210, and packet forwarder 211 in processing the packet. In such implementations, flow data exporter 226 can store the packet residency time $T_R$ in the flow data record 228.

Flow data exporter 226 can export (e.g., transmit) one or more flow data records 228 to traffic flow data collector 104 (FIG. 1). Flow data exporter 226 can format the flow data records 228 according to a protocol and transmit the flow data records 228 to traffic flow data collector 104 according to the protocol. In some aspects, the protocol is the IPFIX protocol. In other aspects, the protocol can be the NetFlow protocol. Other protocols may be used in still other aspects.

In some aspects, as shown in FIG. 2, packet filter monitor 208 and metering process 216 are provided in the forwarding plane 250 of network device 202. This can be desirable, because the time values obtained by the metering process are close to the data link, resulting in highly accurate time values. Further, as shown in FIG. 2, in some aspects flow data exporter 226 is provided in the control plane 250. In some aspects, flow data exporter 226 may be provided in the data plane 250.

Figure 3:
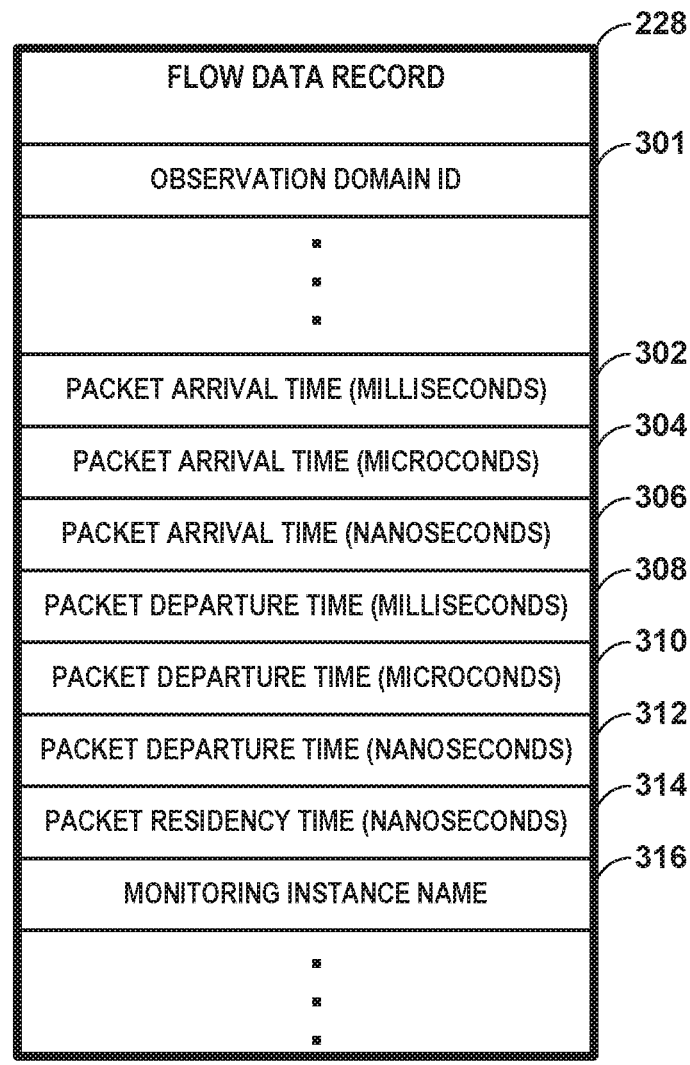
FIG. 3 is a block diagram illustrating a data structure including elements used to measure packet residency in in accordance with various aspects of the techniques described in this disclosure.

FIG. 3 is a block diagram illustrating a data structure for an example flow data record 228 including elements used to measure packet residency in in accordance with various aspects of the techniques described in this disclosure. FIG. 3 illustrates an example flow data record 228 including data elements that are extensions to those specified by the IPFIX protocol. In some aspects, example flow data record 228 includes an observation domain identifier (ID) 301 that uniquely identifies the network device that generated the flow data record 228 within a group of network devices providing flow data records to a traffic flow data collector. Data elements 302-316 comprise extensions to the IPFIX protocol. Data elements 302-306 are associated with a packet arrival time $T_A$ of a packet. The packet arrival time includes a milliseconds portion 302, a microseconds portion 304, and a nanoseconds portion 306. Data elements 308-312 are associated with a packet departure time $T_D$ of a packet. The packet departure time $T_D$ includes a milliseconds portion 308, a microseconds portion 310, and a nanoseconds portion 312. A packet residency time 314 can be represented in nanoseconds. As noted above, in some implementations, the packet residency time 314 can be calculated by the flow data exporter 226. In other implementations, the packet residency time 314 can be calculated by the traffic flow data collector 104 (FIG. 1) based on the packet arrival time and the packet departure time in the flow data record 228. In such implementations, packet residency time 314 may not be present in the data flow record 228, or a value for the packet residency time 314 field of data flow record 228 may be provided by the data flow collector 104.

Figure 4:
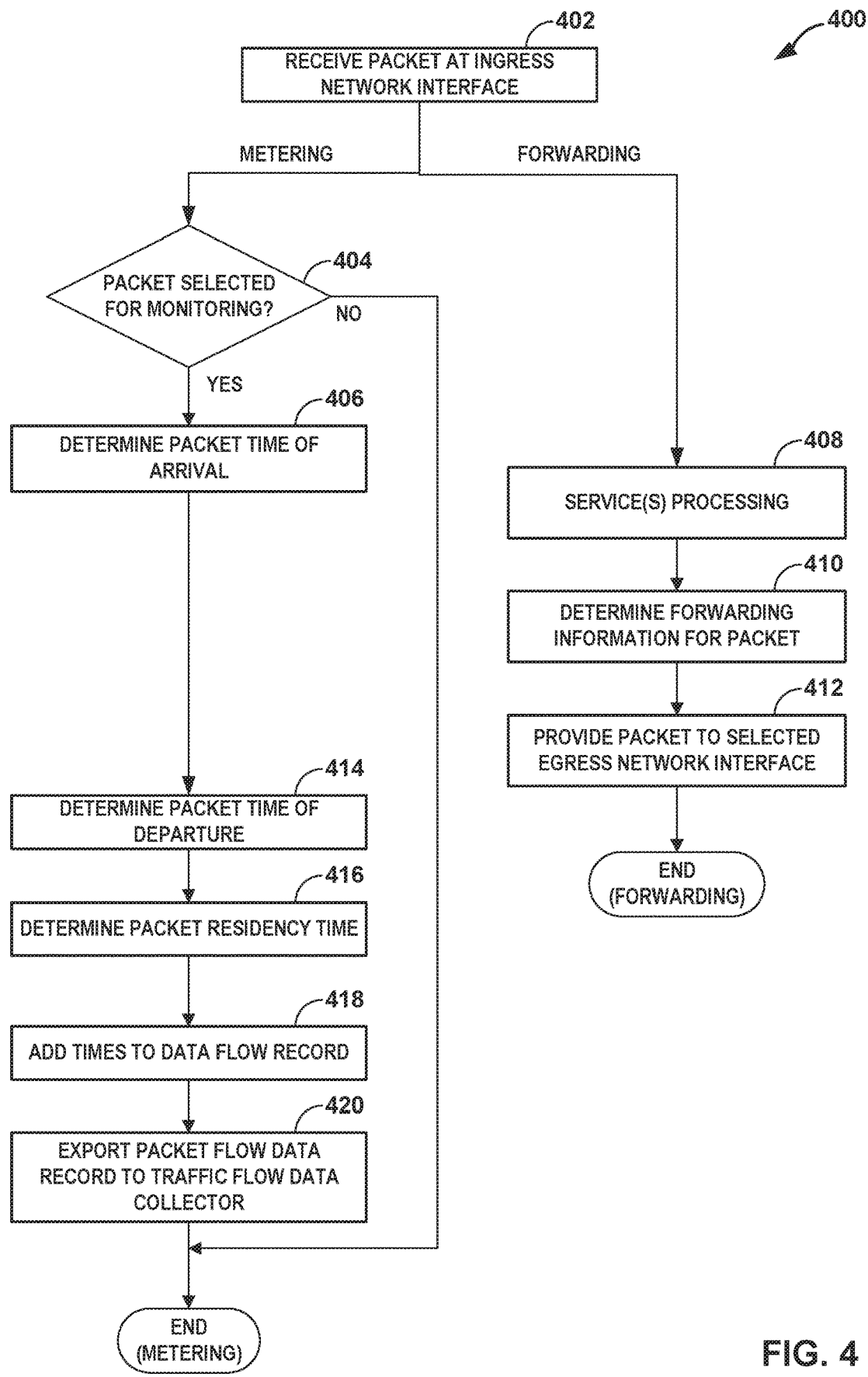
FIG. 4 is a flowchart illustrating example operations of a network device in accordance with various aspects of the techniques described in this disclosure.

FIG. 4 is a flowchart illustrating example operations of a network device 102, 202 in accordance with various aspects of the techniques described in this disclosure. The operations begin with receiving a network packet at a network interface (402). For example, the network packet may be received at a router, switch, gateway or other device configured to receive and send network packets.

Processing of the incoming network packet may take two paths. A forwarding path of the flowchart includes operations associated with forwarding the network packet to the next hop towards the destination. A metering path of the flowchart includes operations associated with obtaining metrics related to processing the incoming network packet. For example, timing metrics may be obtained that indicate the amount of time spent processing the packet in the forwarding plane of the network device. This time may include time used by service processes (firewalls, accounting services, access control services etc.) and time used by packet forwarding processes in determining the next hop for the network packet.

Processing along the forwarding path begins with one or more services processing the incoming network packet, if any services are configured for the network device (408). For example, access control services, statistical sampling services, traffic policing services, rate limiting services, firewall services and accounting services may inspect packet headers and/or payload data and perform service related actions based on the packet data.

A packet processor can determine forwarding information for the network packet (410). For example, the packet processor may determine a packet destination address from packet header information. The packet processor can consult a FIB or forwarding table to determine a network address of the network device that is the next hop to the destination address. The packet can then be provided to an egress network interface that can be selected based on the next hop network device's network address (412). The forwarding path ends with the packet being transmitted via the selected network interface.

Operations along the metering path also begin when the packet is received on the ingress network interface. A filter can inspect packet data to determine if the packet has been selected for monitoring (404). For example, a monitoring instance may include criteria that can be used to select a packet for monitoring. The criteria can include some or all of a 5-tuple (source address, source port, destination address, destination port, protocol) or other matching criteria. Additionally, a sampling rate may be defined by the monitoring instance. The sampling rate can specify a frequency that packets are selected for monitoring. For example, a sampling rate of 1024 can indicate that one packet out of every 1024 packets received are selected to determine if the packet data matches the filter criteria. If the packet has not been selected for monitoring ("NO" branch of 404), no further operations are performed with respect to metering and the metering path ends.

If a packet has been selected for monitoring ("YES" branch of 404), a metering process can obtain a packet arrival time $T_A$ of the packet (406). In some aspects, the packet arrival time may be determined down to the nanosecond level. The metering process may obtain a packet departure time $T_D$ of the packet when the packet has been transmitted from the egress network interface (414). In some aspects, the packet departure time may be determined down to the nanosecond level. The metering process can provide the packet arrival time and packet departure time to a flow data exporter.

In some aspects, the flow data exporter may determine a packet residency time $T_R$, based on the packet arrival time and packet departure time received from the metering process, where $T_R=T_D-T_A$ (416). The packet residency time can represent the amount of time the packet was resident on the network device. This time can include time spent by services processing the packet and the time spent determining the next hop for the packet. The flow data exporter can create a data flow record and add the packet arrival time, packet departure time and packet residency to the data flow record (418). Other data elements may be included in the data record. For example, an observation domain identifier may be added to the data flow record. The observation domain identifier can be a network address, device identifier, Globally Unique Identifier (GUID), or other identifier that that can be used to distinguish the network device creating the data flow record from other network devices providing data flow records to a traffic collector. Additionally, a monitoring instance name can be added to the data flow record. The monitoring instance name identifies a monitoring instance specifying the criteria that caused the network packet to be selected for metering. The metering process can export the data flow record to a traffic flow data collector (420) and the metering operations end. Other data elements may also be included with the data flow record.

Figure 5:
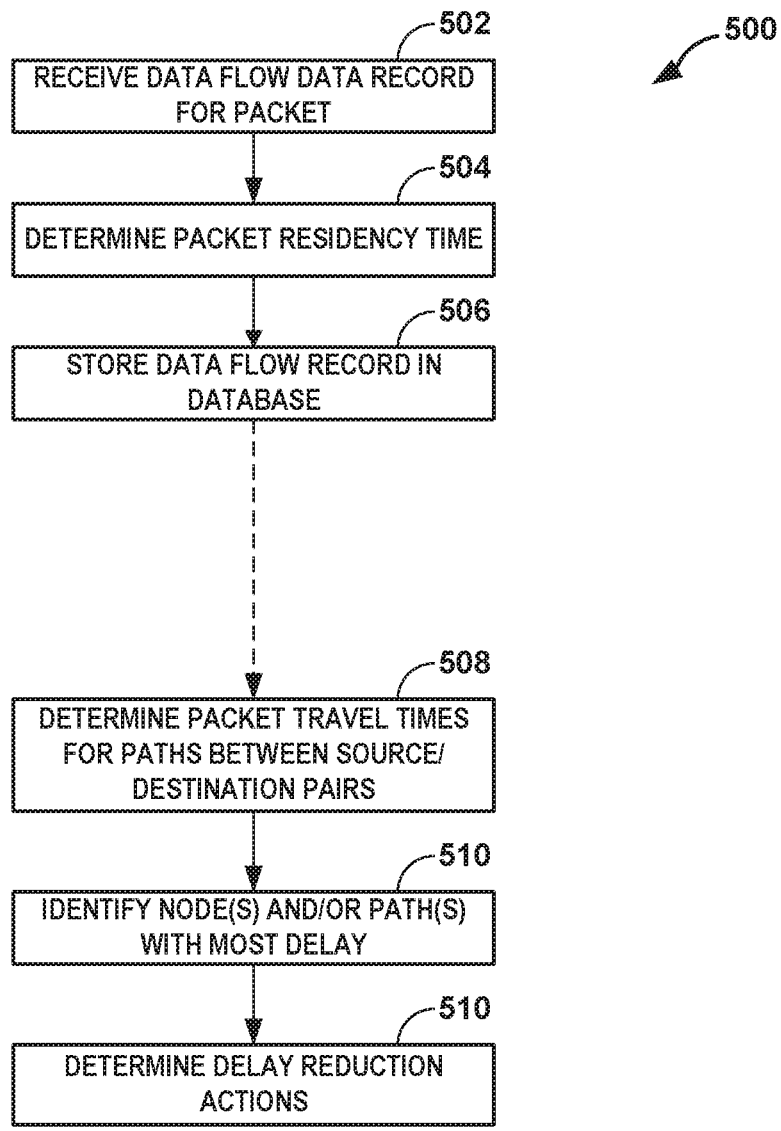
FIG. 5 is a flowchart illustrating example operations to collect and analyze data flow records in accordance with various aspects of the techniques described in this disclosure.

FIG. 5 is a flowchart illustrating example operations to collect and analyze data flow records in accordance with various aspects of the techniques described in this disclosure. The traffic flow data collector receives a data flow record for a packet (502). In some aspects, the packet residency time $T_R$ discussed above is not determined at the network device and is instead determined by the traffic flow data collector (504). The traffic flow data collector can store the data flow record in a database for analysis (506), either by the traffic flow data collector or other application.

In some aspects, the analysis can include determining packet travel times for one or more paths between source and destination pairs (508). The packet arrival times and packet departure times for network devices in the path that a packet traveled from the source to the destination can be used to determine both a total time from source to destination and network connection travel times for network connections between the network devices in the path. Using the example network system 100 shown in FIG. 1, the packet departure time of a packet from observation point P2 of network device 102A and the packet arrival time of the packet at observation point P3 of network device 102B can be used to determine a travel time for the network connection between network device 102A to 102B. Similarly, the packet arrival time of a packet at observation point P1 and the packet departure time of the packet at observation point P6 can be used to determine a total travel time through the network 108.

Further, the analysis can include determining the network devices and paths (or network connections within a path) having the most delay (510). For example, travel times for network connections and total travel times through a network path can be used to determine paths and connections having the most delay. The packet residency times of each network device can be used to determine network devices causing the most delay in the network.

The results of the above-described analysis can be used to determine actions that may reduce delay in the network. For example, network devices having most delay (e.g., the highest packet residency times) can be analyzed to determine if any of the services executing on the network device can be removed, or reconfigured, or load balanced to a different network device in order to reduce the time spent processing a packet. Further, RIBS, FIBs and/or forwarding tables may be modified to steer network traffic away from network devices having high packet residency times and towards network devices having comparatively lower packet residency times.

The techniques described above have been discussed in the context of services provided by physical network devices. The techniques can be applied as well to virtual devices such as virtual routers, virtual switches etc.

In some examples, a method includes receiving, by at least one computing device, one or more flow data records from a plurality of network devices, each of the flow data records including a packet arrival time and a packet departure time, determining, by the at least one computing device from the one or more flow data records, one or more network paths from a source device to a destination device, the one or more network paths including two or more of the plurality of network devices, identifying, by the at least one computing device, a first network device along the one or more network paths having a highest packet residency time, the packet residency time based on the packet arrival time and the packet departure time, and determining, by the at least one computing device, a delay reduction action for the first network device.

In some examples, a method includes receiving, via a first network interface of a network device, a network packet of a packet flow; determining, by one or more processors of the network device, a packet arrival time of the network packet at the first network interface, providing, by the one or more processors, the network packet to a second network interface of the network device for transmission toward a destination, determining, by the one or more processors, a packet departure time for the network packet from the second network interface; creating, by the one or more processors, a flow data record specifying the packet arrival time and the packet departure time, and providing, by the one or more processors, the flow data record to a traffic flow data collector device physically separate from the network device.

The techniques described herein may be implemented in hardware, software, firmware, or any combination thereof. Various features described as modules, units or components may be implemented together in an integrated logic device or separately as discrete but interoperable logic devices or other hardware devices. In some cases; various features of electronic circuitry may be implemented as one or more integrated circuit devices, such as an integrated circuit chip or chipset.

If implemented in hardware, this disclosure may be directed to an apparatus such a processor, processing circuitry, or an integrated circuit device, such as an integrated circuit chip or chipset. Alternatively; or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A network device comprising:
a first network interface;
a second network interface;
a plurality of monitoring instances, each monitoring instance having a corresponding monitoring instance name and corresponding filter criteria;
a packet filter comprising processing circuitry configured to select a network packet based on the filter criteria for each of the monitoring instances;
a forwarding unit comprising processing circuitry configured to:
 receive, via the first network interface, a network packet of a packet flow,
 in response to a determination that the network packet is the selected network packet, determine a packet arrival time of the selected network packet at the first network interface,
 provide the network packet to the second network interface for transmission toward a destination,
 in response to a determination that the network packet is the selected network packet, determine a packet departure time for the selected network packet from the second network interface; and
a flow data exporter comprising processing circuitry configured to:
 create a flow data record specifying the monitoring instance name corresponding to the selection criteria for the selected network packet, the packet arrival time and the packet departure time, and
 provide the flow data record to a traffic flow data collector device physically separate from the network device.

2. The network device of claim 1, wherein the flow data exporter is further configured to:
determine a packet residency time for the network device based on the packet arrival time and the packet departure time; and
add the packet residency time to the flow data record provided to the traffic flow data collector.

3. The network device of claim 1, wherein the filter criteria are provided by monitoring instance data of the monitoring instance, the monitoring instance data comprising a packet source address, a packet destination address and a protocol.

4. The network device of claim 3, wherein the monitoring instance data includes a sampling rate, wherein the packet filter selects network packets according to the sampling rate.

5. The network device of claim 1, wherein the packet arrival time and the packet departure time include a first value in milliseconds, a second value in microseconds, and a third value in nanoseconds.

6. The network device of claim 1, wherein the flow data record is formatted according to a version of the Internet protocol flow information export (IPFIX) protocol.

7. The network device of claim 1, wherein the flow data record includes an observation domain identifier identifying the network device.

8. A traffic flow data collector comprising:
one or more processors; and
a computer-readable medium comprising instructions for causing the one or more processors to:
 receive one or more flow data records from a plurality of network devices, each flow data record of the flow data records including a monitoring instance name, a packet arrival time and a packet departure time for a network packet, wherein the flow data record is generated by a network device of the plurality of network devices based on the network packet matching filter criteria specified by monitoring instance data corresponding to the monitoring instance name, determine, from the one or more flow data records, one or more network paths from a source device to a destination device, the one or more network paths including two or more of the plurality of network devices, identify a first network device along the one or more network paths having a highest packet residency time, the packet residency time based on the packet arrival time and the packet departure time, and determine a delay reduction action for the first network device.

9. The traffic flow data collector of claim 8, wherein the delay reduction action comprises a change to at least one forwarding table on a second network device to cause the second network device to forward packets away from the first network device.

10. The traffic flow data collector of claim 8, wherein the delay reduction action comprises a change in one or more services provided on the first network device.

11. The traffic flow data collector of claim 8, wherein the instructions include instructions to determine the packet residency time.

12. The traffic flow data collector of claim 8, wherein each flow data record includes an observation domain identifier (ID) identifying a source network device of the plurality of network devices for the flow data record, wherein the one or more network paths are determined according to the observation domain ID, a source identifier for the source device, and a destination identifier for the destination device.

13. The traffic flow data collector of claim 8, wherein the the monitoring instance data comprises a packet source address and a packet destination address.

14. The traffic flow data collector of claim 8, wherein the packet arrival time and the packet departure time include a first value in milliseconds, a second value in microseconds, and a third value in nanoseconds.

15. The traffic flow data collector of claim 8, wherein the flow data records are formatted according to a version of the IPFIX protocol.

16. The traffic flow data collector of claim 8, wherein each flow data record includes an observation domain identifier identifying the network device providing the flow data record.

17. The traffic flow data collector of claim 8, wherein the traffic flow data collector is included with a Software Defined Network controller.

18. A method comprising:

obtaining, by at least one computing device and from a flow data record received from a network device, a packet arrival time indicating a time that a network packet arrives at the network device, wherein the flow data record includes a monitoring instance name of monitoring instance data specifying selection criteria for the network packet;

obtaining, by the at least one computing device and from the flow data record, a packet departure time indicating a time the network packet departed the network device;

determining, by the at least one computing device, a packet residency time for the network device based on the packet arrival time and the packet departure time; and determining, by the at least one computing device and based on the packet residency time for the network device and packet residency times for a plurality of other network devices, a delay reduction action for one or more of the network devices and the plurality of other network devices.

* * * * *